Jesse C. Boyd's
Cultivator
73291
PATENTED
JAN 14 1868
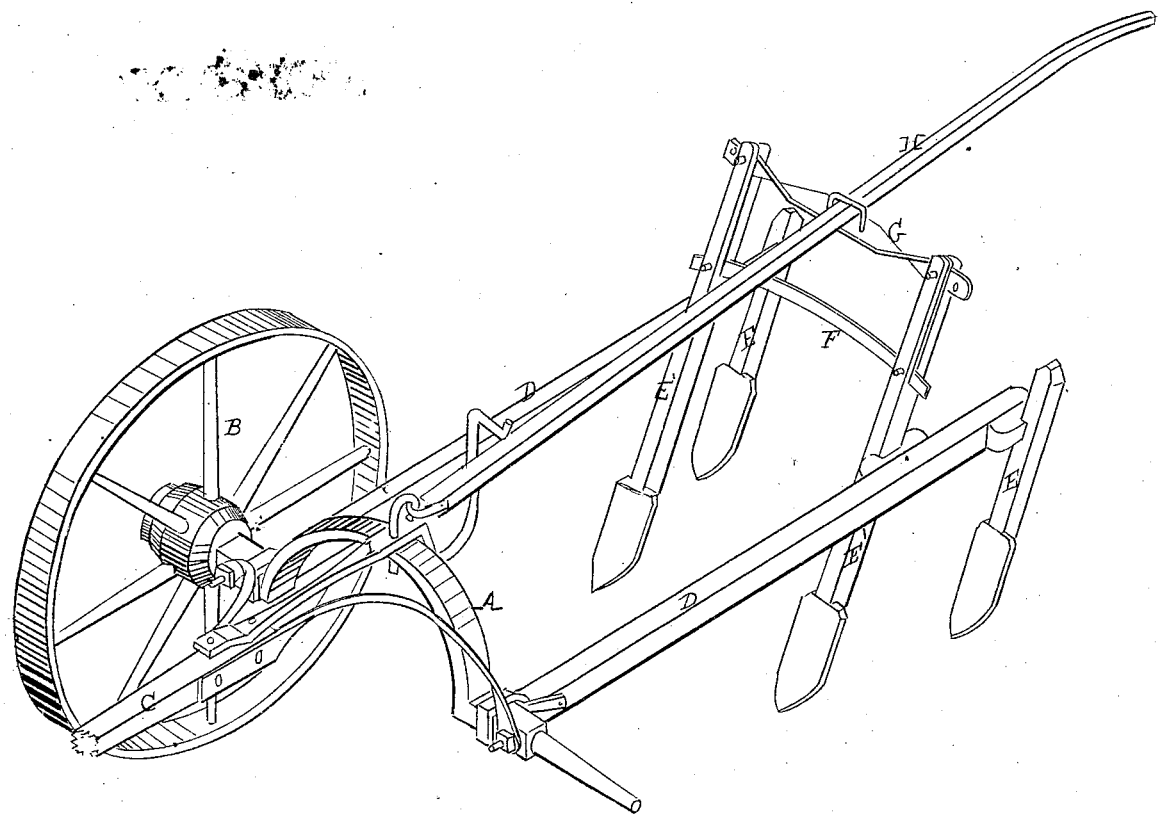
Witnesses
A. N. Marr
Cornelius Cox
Inventor
Jesse C. Boyd
per
Alexander Mason
Atty

United States Patent Office.

JESSE C. BOYD, OF MILROY, INDIANA, ASSIGNOR TO HIMSELF, C. P. WILSON, AND L. L. BOBLET.

Letters Patent No. 73,291, dated January 14, 1868.

IMPROVEMENT IN CULTIVATORS.

The Schedule referred to in these Letters Patent and making part of the same.

TO ALL WHOM IT MAY CONCERN:

Be it known that I, JESSE C. BOYD, of Milroy, in the county of Rush, and in the State of Indiana, have invented certain new and useful Improvements in Cultivators; and I do hereby declare that the following is a full, clear, and exact description thereof, reference being had to the accompanying drawings, and to the letters of reference marked thereon.

In the annexed drawing, making part of this specification, A represents the axle of the machine, which is made of metal, and curved upward at its centre in the manner represented in the figure. B represents the wheels which support this axle, and which may be made in any of the known and usual ways. C represents the tongue, by means of which the cultivator is drawn. D D represent the beams, which are two in number, each being provided with two shanks, E E', to the lower ends of which are secured cultivator-teeth of any approved construction.

The two shanks of each beam are secured at different sides, and the beam is made thicker at the points of connection, so that the shanks, with their teeth, are thrown wide enough apart. The beams are connected to the axle by means of two clevises, one upon the axle, which can be shifted to suit any width desired, and the other upon the beam, which works up or down, and adapts itself to the ground.

The shanks E E' extend above their beams, and are connected together at their upper ends by means of the bars F and G. The ends of these bars pass into mortises or slots in the shanks, and are pivoted to them. H represents the handle, by means of which the cultivator is managed, the forward end of said handle being hooked to the centre of the axle, and its rear end, passing through a loop upon the centre of bar G, extends behind the beams, so that the operator, in walking after the cultivator, can shift the beams, with their shanks and teeth, to suit the nature of the work which he is performing.

I represents a metallic bar, which is secured at one end to the tongue C, and about its centre to the centre of the axle. The rear end of this bar is curved, as represented, and its point bent so as to rest the bar H upon. The object of this bar is to keep the teeth out of the ground when moving the cultivator from one field to another.

The operator, by using the handle H, may shift the beams to one side or the other, may incline them either way, or may lift them, with their teeth, from the earth.

Having thus fully described my invention, what I claim as new, and desire to secure by Letters Patent, is—

The arrangement of the beams D, with their attachment directly to the axle A, by means of shifting-clevises, with handle H, bar I, and bars F and G, the several parts being constructed and operating substantially as and for the purpose specified.

In testimony that I claim the foregoing, I have hereunto set my hand, this 10th day of September, 1867.

JESSE C. BOYD.

Witnesses:
G. W. TOMKINS,
JOHN RICHEY.